No. 639,069. Patented Dec. 12, 1899.
G. LOVELL.
SLASH OR BILL HOOK.
(Application filed May 11, 1899.)
(No Model.)
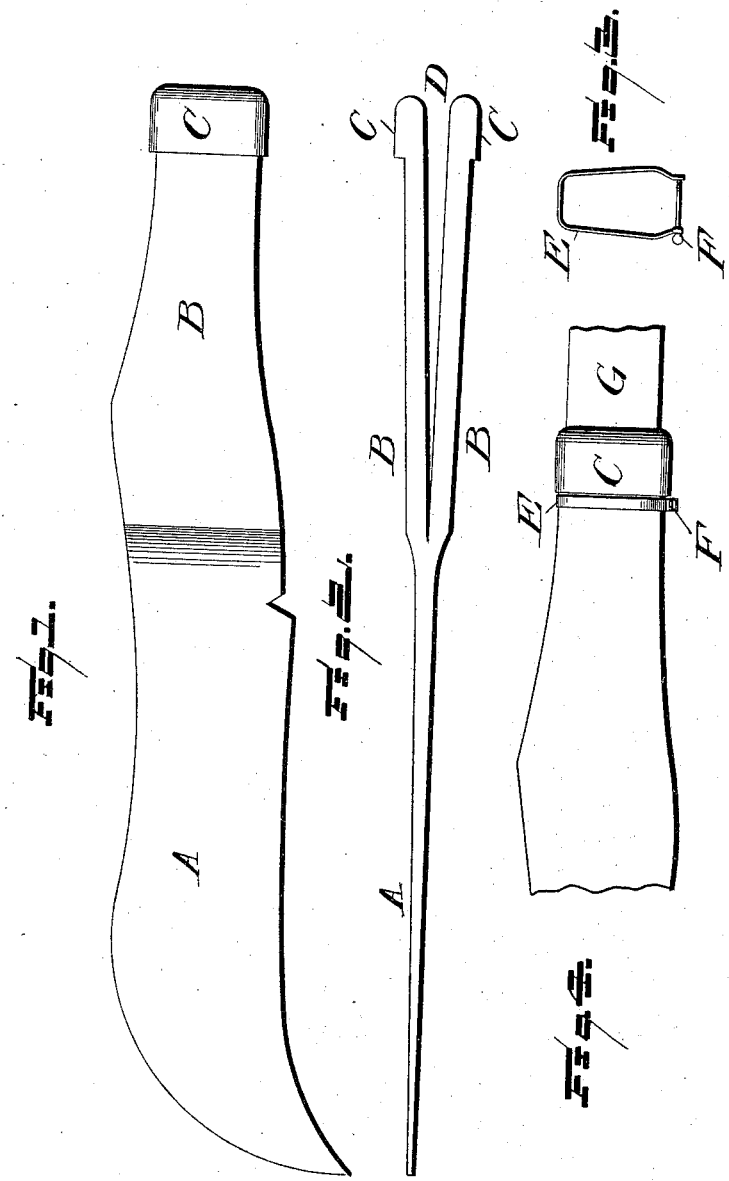

UNITED STATES PATENT OFFICE.

GEORGE LOVELL, OF OPITONUI, NEW ZEALAND.

SLASH OR BILL HOOK.

SPECIFICATION forming part of Letters Patent No. 639,069, dated December 12, 1899.

Application filed May 11, 1899. Serial No. 716,460. (No model.)

*To all whom it may concern:*

Be it known that I, GEORGE LOVELL, bushman, a subject of Her Majesty the Queen of the United Kingdom of Great Britain and Ireland, and a resident of Opitonui, in the provincial district of Auckland and Colony of New Zealand, have invented certain new and useful Improvements in Slash or Bill Hooks, of which the following is a specification.

This improved slash or bill hook is intended to hold the handle without rivets by means of a clip and screw, whereby the handle is kept intact and is not weakened by having rivet or other holes made in it, and, further, the formation of the handle end of the hook permits a new or fresh handle to be at once fitted into it without either delay or expense.

This slash or bill hook has a blade shaped the same as any ordinary hook, but with the handle end hollow and open or slit front and back, into which the handle is fitted. The end has a shoulder on each extremity of its open parts, against the inner portion of which a spring-clip is placed after the handle has been fitted. The clip is then screwed tight by a screw fixed into it, and the opened parts are closed on and hold the handle tightly.

Four figures are shown on the accompanying drawings, of which Figure 1 is a plan of the slash or bill hook; Fig. 2, a back elevation of the slash or bill hook, showing the opened or slit parts; Fig. 3, a front elevation of the spring-clip and screw; and Fig. 4, a plan of part of the slash-hook, showing part of the handle secured in it by the spring-clip screwed tight.

A is the blade of the slash or bill hook.

B is the handle end of the slash or bill hook.

C are the shoulders on the end B.

D is the opening in the end B.

E is the spring-clip, F the screw that tightens the clip E, and G is the handle, fitted into the end B.

The blade A is the same as the ordinary blade; but the handle end B differs from those now in use, in that it has its hollowed part parted or slit in the front and back, as shown at D in Fig. 2. The two extremities are raised into shoulders C, as shown in Figs. 1, 2, and 4. The end of the handle G is made to fit tightly into the hollow and slit end B, so that when the spring-clip E is closed over it and tightened by the screw F it is held firmly. The shoulders C prevent the clip E from coming off the end B and keep it in position.

The two chief advantages of this slash or bill hook are that the handle is not pierced, but is placed in the open end of the hook whole, so that it is not weakened in any way, and that when required a new or fresh handle can be fitted in the hook without delay or expense.

Having fully described my invention, what I desire to claim and secure by Letters Patent is—

1. A slash or bill hook having its handle end slit or parted to provide handle-embracing portions and the extremities of said portions being shouldered, substantially as and for the purpose described.

2. In combination a slash or bill hook having its handle end hollow and parted or slit, its extremities shoulder-shaped, a spring-clip and screw to fit over the handle end and against the shoulders when the handle is inserted therein for the purpose set forth as herein described.

3. A slash or bill hook having its handle end slit longitudinally to provide two similar handle-embracing portions, the extremities of which are shoulder-shaped, and means surrounding the said handle portions and acting against the shoulders for securing the handle in place when inserted between the handle-embracing portions.

GEORGE LOVELL.

Witnesses:
GEORGE WILLIAM BASLEY,
PERCY HERBERT BASLEY.